United States Patent

[11] 3,603,229

[72] Inventors Rolf Noack;
Johannes Weise, both of Dresden, Germany
[21] Appl. No. 753,489
[22] Filed Sept. 19, 1968
[45] Patented Sept. 7, 1971
[73] Assignee VEB Pentacon Dresden Kamera-und Kinowerke
Dresden, Germany

[54] FLASHLIGHT IGNITION DEVICE FOR PHOTOGRAPHIC CAMERAS
7 Claims, 3 Drawing Figs.

[52] U.S. Cl.................................................. 95/11.5 R,
95/63
[51] Int. Cl............................................... G03b 9/70,
G03b 9/14
[50] Field of Search............................................95/11.5, 63,
53

[56] References Cited
UNITED STATES PATENTS

| | | | |
|---|---|---|---|
| 2,367,526 | 1/1945 | Riddell | 95/63 |
| 2,782,702 | 2/1957 | Willcox | 95/63 |
| 2,238,453 | 4/1941 | Small | 95/11.5 |
| 2,511,201 | 6/1950 | Fuerst | 95/11.5 X |
| 2,681,601 | 6/1954 | Blodgett et al. | 95/11.5 |
| 2,772,614 | 12/1956 | Rentschler | 95/11.5 |
| 3,095,793 | 7/1963 | Loose et al. | 95/11.5 |
| 3,134,312 | 5/1964 | Kiper | 95/11.5 |
| 3,162,108 | 12/1964 | Knorr et al. | 95/11.5 |
| 3,362,310 | 1/1968 | Kiyoshi Kitai | 95/11.5 |

FOREIGN PATENTS

| | | | |
|---|---|---|---|
| 853,558 | 10/1952 | Germany | 95/11.5 |

Primary Examiner—Samuel S. Matthews
Assistant Examiner—Robert P. Greiner
Attorney—Young & Thompson ABSTRACT: A photographic camera having a housing, a shutter mechanism and an aperture passage is provided with an additional shutter mechanism for flashlight operation purposes. The additional shutter mechanism includes a drive ring mounted within the housing arranged to be driven by a spring, a plurality of shutter blades pivotably mounted on the housing to form an additional shutter adapted to be driven by the drive ring between a closed position and a fully open position via a pivoted drive lever, a setting ring mounted on the housing settable into "flash" or "daylight" exposure positions, release means mounted on the housing for locking the drive ring in a cocked position, an actuating member provided on the drive ring for actuating a flash ignition circuit when the drive ring is running-off out of the cocked position in use during a flash exposure, a stop member provided on the setting ring for stopping the drive ring running-off out of the cocked position, a first projection on the setting ring arranged to release the release means when the setting ring is set in the "daylight" position, and a second projection on the setting ring arranged to move the drive lever to open the additional shutter when the setting ring is in the "daylight" position.

INVENTORS
ROLF NOACK
JOHANNES WEISE
By Young + Thompson
ATTYS.

3,603,229

FLASHLIGHT IGNITION DEVICE FOR PHOTOGRAPHIC CAMERAS

BACKGROUND OF THE INVENTION

The invention relates to a flashlight ignition device for photographic cameras, especially monocular mirror-reflex cameras. Shutter mechanisms having an additional shutter i.e. a shutter which is used for flashlight exposures only and which is releasable on actuation of the camera release for running-off possess the advantage that it is possible to dispense with control mechanisms which synchronize the running-off steps or movements of the camera mechanism with the running-off steps of the additional shutter in functional sequence. However in hitherto known cameras including an additional shutter mechanism the running-off steps are controlled directly by the actuation of the shutter release, and undesired pre-exposures or post-exposures are possible as a result of excessively rapid actuation steps of the shutter release coupled with the camera release.

One known camera having an additional shutter mechanism already avoids this disadvantage due to the fact that the drive ring running-off out of the cocked position is braked by a retarding device after the closure of the shutter blades but before the commencement of the actual flash exposure. In this way the camera mechanism running-off at the same time is given time to open completely the normal camera shutter i.e. the shutter used for exposures other than flash exposures, set to a long time exposure. Photographic exposures without use of the attached additional shutter can be carried out by arresting the drive ring in the cocked position, the shutter blades remaining in the open position. Accordingly if one dispenses for a relatively long time with the use of the cocked additional shutter there is the danger that the drive springs may slacken. Furthermore uncocking of the attached additional shutter can take place only with simultaneous actuation of the camera release and thus the execution of an exposure which per se is not wanted, that is to say the loss of a picture.

It is an object of the present invention to provide a shutter mechanism in a photographic camera by which the above disadvantages may be overcome or at least substantially reduced.

SUMMARY OF THE INVENTION

According to the invention this is achieved by a photographic camera having a housing, a shutter mechanism and an aperture passage wherein there is provided an additional shutter mechanism mounted on the housing arranged to be driven by a spring and including a plurality of shutter blades pivotably mounted on the housing to form an additional shutter adapted to be driven by the drive ring between a closed position and a fully open position via a pivoted drive lever, a setting ring mounted on the housing settable into "flash" or "daylight" exposure positions, release means mounted on the housing for locking the drive ring in a cocked position, an actuating member provided on the drive ring for actuating a flash ignition circuit when the drive ring is running-off out of the cocked position in use during a flash exposure, a stop member provided on the setting ring for stopping the drive ring running-off out of the cocked position, a first projection on the setting ring arranged to release the release means when the setting ring is set in the "daylight" position, and a second projection on the setting ring arranged to move the drive lever to open the additional shutter when the setting ring is in the "daylight" position. Thereby the present invention has the advantage that it is possible to dispense with carrying out a flash exposure, in favor of a daylight exposure, without simultaneous release of the camera shutter, even if the additional shutter was already cocked. Furthermore a photographic daylight exposure without use of the additional shutter does not require any prior cocking of the additional shutter in order to transfer the latter into the open position.

According to one embodiment the invention the setting ring is loaded by a return spring which seeks to rotate the setting ring into the "daylight" position and is retainable in the "flash" position by a blocking lever against the said return spring. The setting ring is preferably rotatable against the return spring beyond the "flash" position, the drive ring being entrainable into the cocked position and retainable there by a catch lever constituting part of the release means. A reversible ratchet device is expediently allocated to the setting ring between the "flash" position and the cocked position of the shutter mechanism. For the adaptation of the running-off movement of the setting ring to the running-off of the drive ring in the transition from the "flash" position to the "daylight" position the running-off of the setting ring after lifting out of the catch lever by an actuating dog constituting the first projection of the setting ring, but before the striking of the opening dog constituting the second setting ring projection upon an opening pin of the drive lever, will be retarded expediently by an escapement. The toothed segment of the escapement preferably possesses a brake nose and a brake bolt, the brake nose being arranged in the running-off path of the escapement dog provided on the drive ring and the brake bolt being arranged in the running-off path of the escapement extension provided on the setting ring.

BRIEF DESCRIPTION OF THE DRAWING

Details of the invention will be explained by reference to a described and illustrated example of embodiment.

DESCRIPTION OF PREFERRED EMBODIMENT

Figure 1:
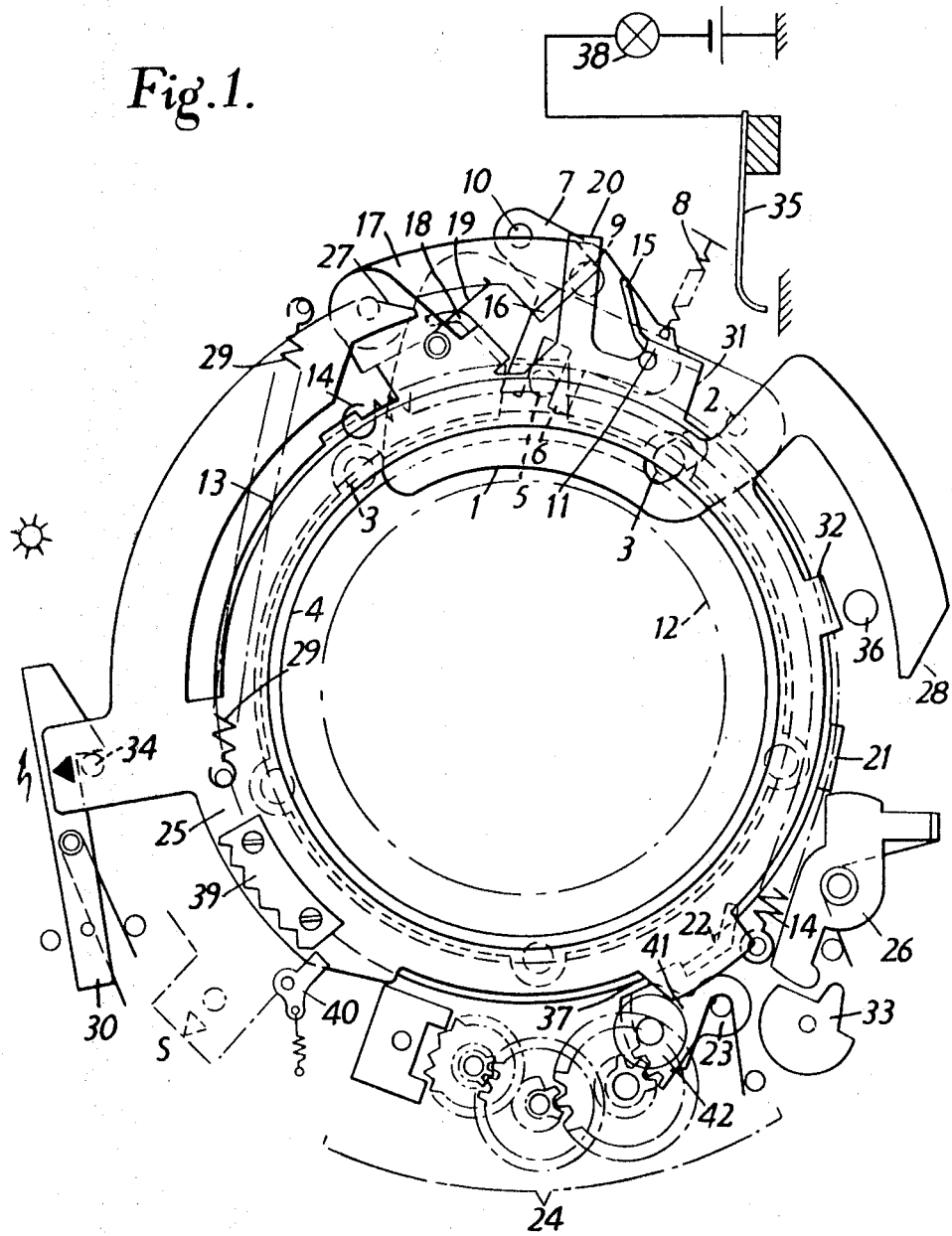
FIG. 1 shows the additional shutter according to the invention in the cocked position for a flash exposure.

In a shutter housing (not represented specially) represented specially) there is provided a normal shutter (not shown), i.e. a shutter used for exposures other than flashlight exposures, and an additional shutter, i.e. a shutter used for flashlight exposures only, which is formed by shutter blades 1, of which only one is illustrated for the sake of simplicity, mounted rotatably about stationary mounting pegs 2. The rotation pins 3 engaging in slots of the shutter blades 1 are arranged on a blade drive ring 4 which is mounted for rotation concentrically about the light passage aperture 12. The blade drive ring 4 further comprises a drive pin 5 which is engaged by an drive fork 6 of a drive lever 7. A closer spring 8 anchored in the shutter housing is connected with the drive lever 7 and seeks to draw the latter in the counterclockwise direction into the position corresponding to the closure position of the shutter blades 1. The drive lever 7 is rotatable about a spindle 9 and carries an opening pin 10 and a transmission pin 11. Coaxially with the blade drive ring 4 is mounted a drive ring 13 which is rotatable in the clockwise direction by a drive spring 14. In the path of the transmission pin 11 a bent-off, rigid, opening tab 15, a rotatable opening lever 17 carrying the opening cam 16 and an angled, rigid, closing tab 18 all of which are provided on the drive ring 13; a loop spring 19 seeks to place the opening lever 17 constantly against an abutment tab 20, also provided on the drive ring 13. Furthermore the drive ring 13 possesses an angled catch tab 21 and an escapement dog 22. A catch lever 26 is pivotably arranged in the running-off path of the catch tab 21, while brake nose 41 of a toothed segment 23 of a gear escapement 24 is mounted in the running-off path of the escapement dog 22. A switch 35, which serves to actuate the ignition circuit for a connected flash lamp 38, lies in the running-off path of the abutment tab 20.

Similarly concentrically with the blade drive ring 4 a setting ring 25 is rotatably mounted, which comprises an opening dog 27 in the path of the opening pin 10 and an actuating dog 28 for the catch lever 26. The catch lever 26 can also be brought out of engagement with the drive ring 13 by rotation in the counterclockwise direction by a release lever 33 coupled with the camera release (not shown) which lever constitutes another part of the release means. A return spring 29 seeks constantly to rotate the setting ring 25 in the clockwise direction; the setting ring 25 can be held fast by a blocking lever 30 in a middle "flash" (⚡) position against this return spring 29. In the running-off path of an abutment arm 31 of the drive ring 13 the setting ring 25 carries an abutment dog 32.

Figure 3:
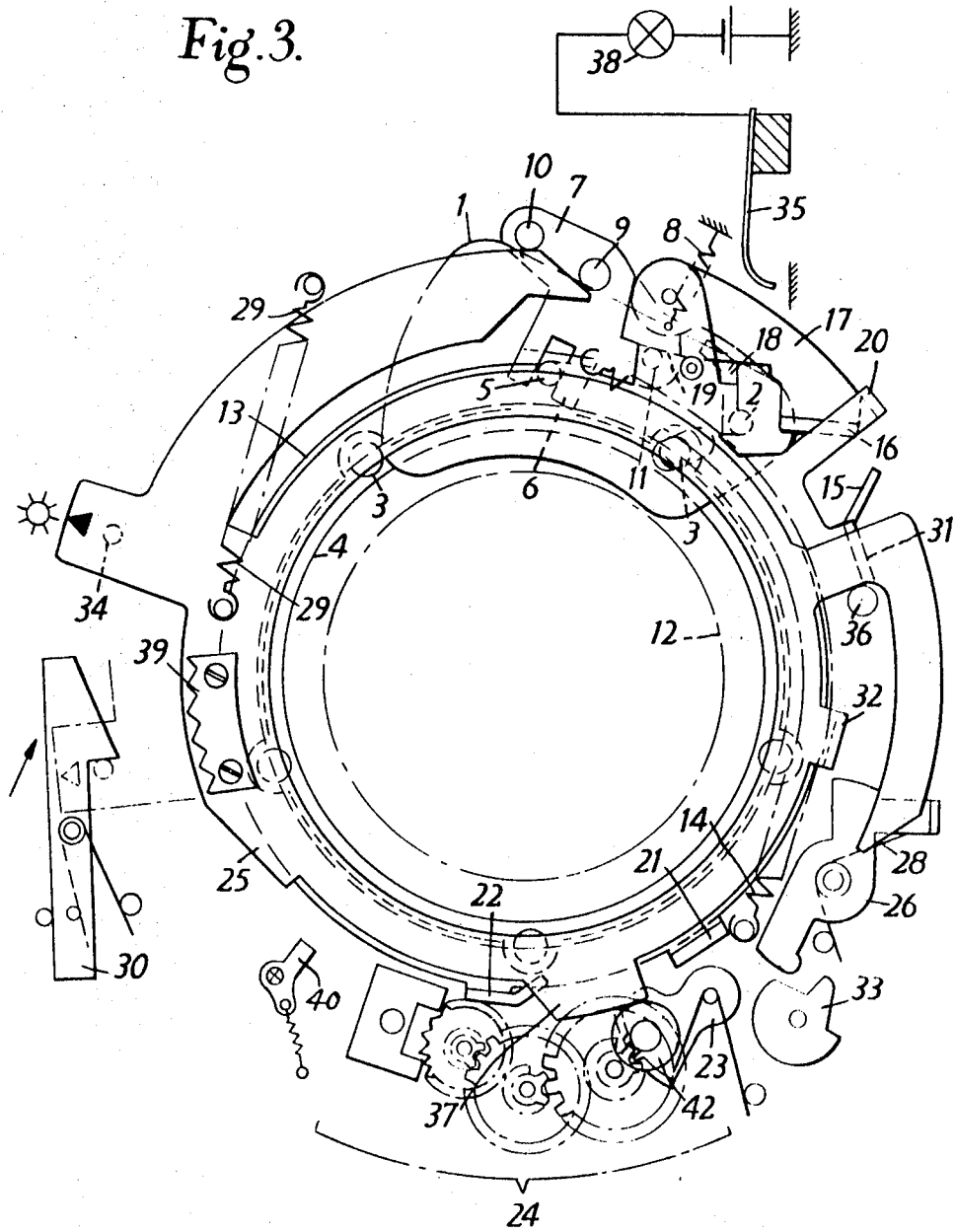
FIG. 3 shows the additional shutter in the uncocked position for a daylight exposure.

The manner of operation is as follows:

If it is intended to dispense with the use of the additional shutter, then the shutter mechanism is situated in the "daylight"(☼)position (see FIG. 3). In this position the catch lever 26 is held by means of the actuating dog 28 out of engagement with the catch tab 21 of the drive ring 13, while by means of the opening dog 27 of the setting ring 25 the opening pin 10 is engaged and thus the drive lever 7 has been pivoted into the position corresponding to the open position of the blades 1.

Figure 2:
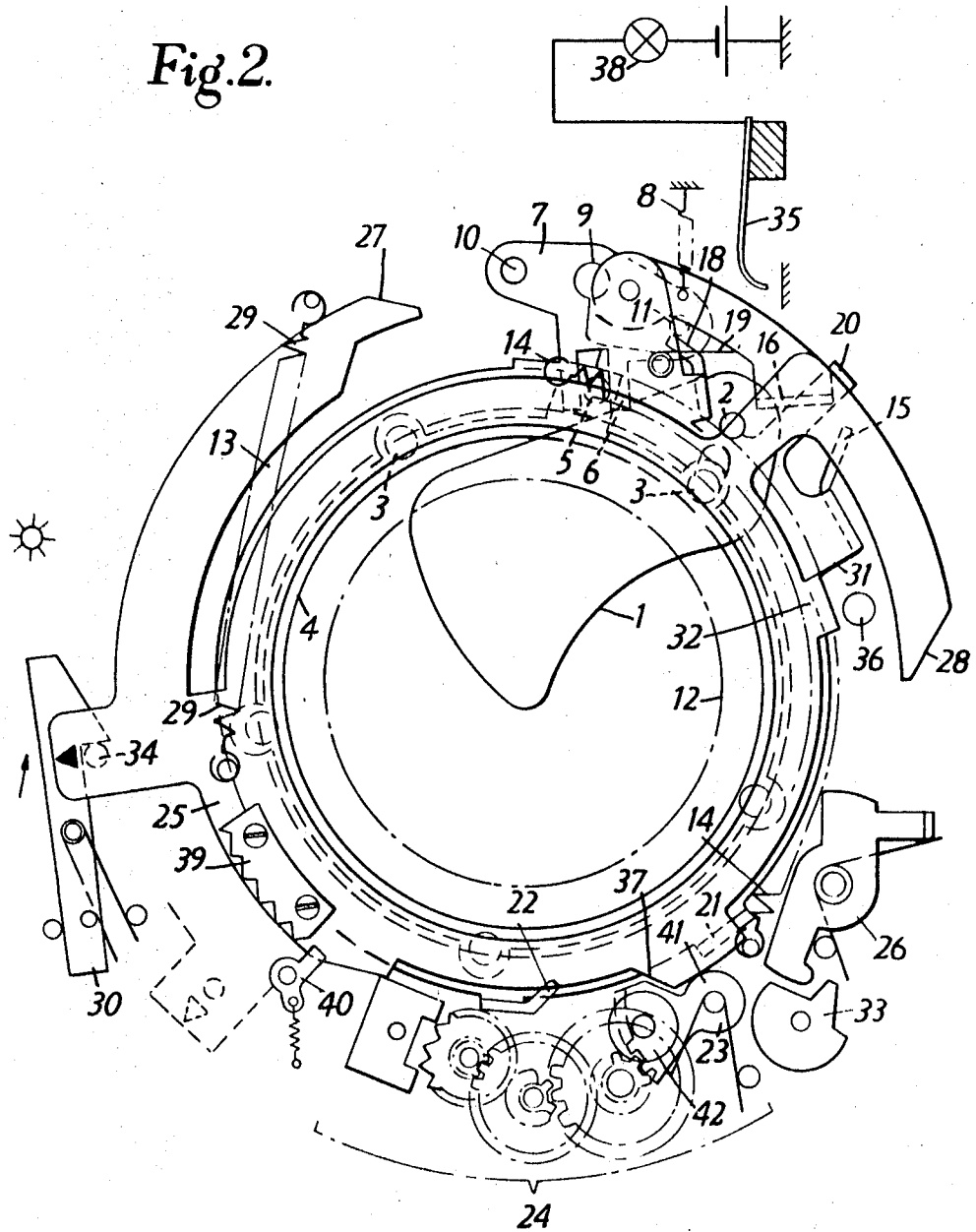
FIG. 2 shows the additional shutter set for flash exposure after termination of the flash exposure.

If a flash exposure is to be carried out with use of the additional shutter, the additional shutter is cocked, in that the setting ring 25 is rotated out of the "daylight" position in the counterclockwise direction beyond the "flash" position (see FIG. 1) into the cocked position "S." In this movement the abutment dog 32 through the abutment arm 31 entrains the drive ring 13, so that the drive ring 13 is cocked against the drive spring 14. At the same time the opening dog 27 of the setting ring 25 disengages the opening pin 10 of the drive lever 7 so that the closure spring 8 can rotate the drive lever 7 in the counterclockwise direction and can rotate the shutter blades 1, as a result of the drive fork 6 engaging the drive pin 5, similarly in the counterclockwise direction into the closed position which may be seen from FIG. 2. In this position the shutter blades 1 temporarily cover the light passage aperture 12.

During this cocking movement of the drive ring 13 the drive lever 7 initially remains in the closed position, into which it has been rotated by the closure spring 8 after the pivoting-out of the opening dog 27 of the setting ring 25 (see FIG. 2), for the closure tab slides away beneath the transmission pin 11 and the opening lever 17 strikes with the back of its opening cam 16 against the transmission pin 11, being lifted away from the abutment tab 20 against the loop spring 19. As soon as the transmission pin 11 disengages the opening cam 16, the opening lever 17 returns as a result of the loop spring 19 into the position defined by the abutment tab 20. When the cocked position "S" is reached (see FIG. 1), the opening tab 15 strikes upon the transmission pin 11 and rotates the drive lever 7 in the clockwise direction against the closure spring 8, so that the shutter blades 1 are pivoted out of the light passage aperture 12. In this cocked position, corresponding to the open position of the shutter blades 1, the drive ring 13, is held by the catch lever 26 which lies in the running-off path of the catch tab 21.

On release of the setting ring 25 the latter returns as a result of the return spring 29 into the "flash" position (see FIG. 1), where the blocking lever 30 is arranged in the running-off path of a blocking pin 34. This return to the "flash" position is possible after the cocked position "S" has been reached as a result of a reversible ratchet device 39, 40, the portion 40 of which is pivotally mounted on the camera housing (not shown).

On actuation of the camera release (not shown) the release lever 33 is rotated in the counterclockwise direction and at the same time the catch lever 26 is brought out of engagement with the catch tab 21. As a result of the action of the drive spring 14 the drive ring 13 runs off in the clockwise direction, the opening tab 15 disengaging the transmission pin 11, so that the closure spring 8 can rotate the drive lever 7 into the position corresponding to the closed position of the blades 1. While the normal camera shutter, set for a long time exposure, it thereupon opening, the escapement dog 22 of the drive ring 13 strikes the toothed segment 23, whereby the further running-off of the drive ring 13 is initially retarded. This delay is such that the normal shutter can open completely before the opening cam 16 of the drive ring 13 reaches the transmission pin 11. As the opening lever 17 bears upon the abutment tab 20, the opening cam 16 strikes the transmission pin 11 and rotates the drive lever 7 in the clockwise direction, so that the shutter blades 1 come into the open position necessary for the photographic exposure. When this open position of the shutter blades 1 is reached the switch 35 is closed by the abutment tab 20 of the drive ring and thus the ignition circuit for the flash lamp 38 is actuated. After the opening cam 16 has left the transmission pin 11, the closure spring 8 with the assistance of the closure cam 18 rotates the drive lever of into the closure position again (see FIG. 2). At the end of this exposure operation, carried out by the running-off of the drive ring 13, the drive ring 13 is halted by striking of its abutment arm 31 upon the abutment dog 32 of the setting ring 25, which is held fast by the blocking lever 30. In this position of the drive ring 13 the transmission pin 11 lies on the closure cam 18, so that undesired opening of the shutter blades 1 for example due to bouncing is avoided.

If after the cocking of the additional shutter (see FIG. 1) a photographic exposure is to be carried out without the use of the additional shutter, then by actuation of the blocking lever 30 the additional shutter is set out of action and uncocked. As a result of the return spring 29 the setting ring 25 returns into its "daylight" position (see FIG. 3). In this case the operating dog 28 of the setting ring 25 lifts the catch lever 26 out of the running-off path of the catch tab 21 of the drive ring 13, so that independently of the actuation of the release lever 33 the drive ring 13 is released to run off. Furthermore the abutment dog 32 departs from the abutment arm 31 so that the drive ring 13 can move into the position determined by the stop pin 36.

In this case the closure cam 18 releases the transmission pin 11 so that the setting ring 25 returning into the "daylight" position can rotate the drive lever 7 into the position corresponding to the open position of the shutter blades 1, by means of its opening dog 27 which engages the opening pin 10. Before the opening dog 27 strikes the opening pin 10 the setting ring 25 is retarded by the gear escapement 24 until the release of the transmission pin 11 by the closure cam 18 of the drive ring 13, in that the escapement extension 37 strikes the brake bolt 42 and has to overcome the toothed segment 23 of the escapement 24.

We claim:

1. In a photographic camera having a housing, a shutter mounted on the housing and an aperture passage in the housing, the provision of an additional shutter mechanism including a drive ring mounted within the housing arranged to be driven by a spring, a plurality of shutter blades pivotably mounted on the housing to form an additional shutter adapted to be driven by the drive ring between a closed position and a fully open position via a pivoted drive lever, a setting ring mounted on the housing settable into "flash" or "daylight" exposure positions, release means mounted on the housing for locking the drive ring in a cocked position, an actuating member provided on the drive ring for actuating a flash ignition circuit when the drive ring is running-off out of the cocked position in use during a flash exposure, a stop member provided on the setting ring for stopping the drive ring running-off out of the cocked position, a first projection on the setting ring arranged to release the release means when the setting ring is set in the "daylight" position, and a second projection on the setting ring arranged to move the drive lever to open the additional shutter when the setting ring is in the "daylight" position.

2. A shutter according to claim 1, wherein the setting ring is loaded with a return spring adapted to rotate the setting ring into the "daylight" position, which ring is retainable in the "flash" position by a blocking lever against the loading of the return spring.

3. A shutter according to claim 2 wherein the stop member is adapted to entrain the drive ring into the cocked position when the setting ring is rotated against the return spring beyond the "flash" position, and permits the release means to lock the drive ring against the action of its drive spring.

4. A shutter according to claim 1 including a reversible ratchet device mounted on the housing and arranged to cooperate with the setting ring and being operative between the "flash" position and the cocked position of the shutter mechanism.

5. A shutter according to claim 1 wherein the release means comprises a pivotable catch lever and a pivotable release lever which pivots the catch lever between a lock position and a release position upon actuation of the camera shutter release.

6. A shutter according to claim 5, including an escapement mounted on the housing adapted to retard the running-off of the setting ring upon release of the catch lever by the first projection of the setting ring before the engagement of the second setting ring projection with the drive lever.

7. A shutter as claimed in claim 6, wherein the escapement includes a toothed segment pivotably mounted on the housing and having a brake nose and a brake bolt mounted on the housing, the brake nose being arranged in the running-off path of an escapement dog provided on the drive ring and the brake bolt being arranged in the running-off path of an escapement extension provided on the setting ring.